June 24, 1969    G. M. LANE    3,452,359
GRAVITATIONAL FEED INKING SYSTEM
Filed May 2, 1967
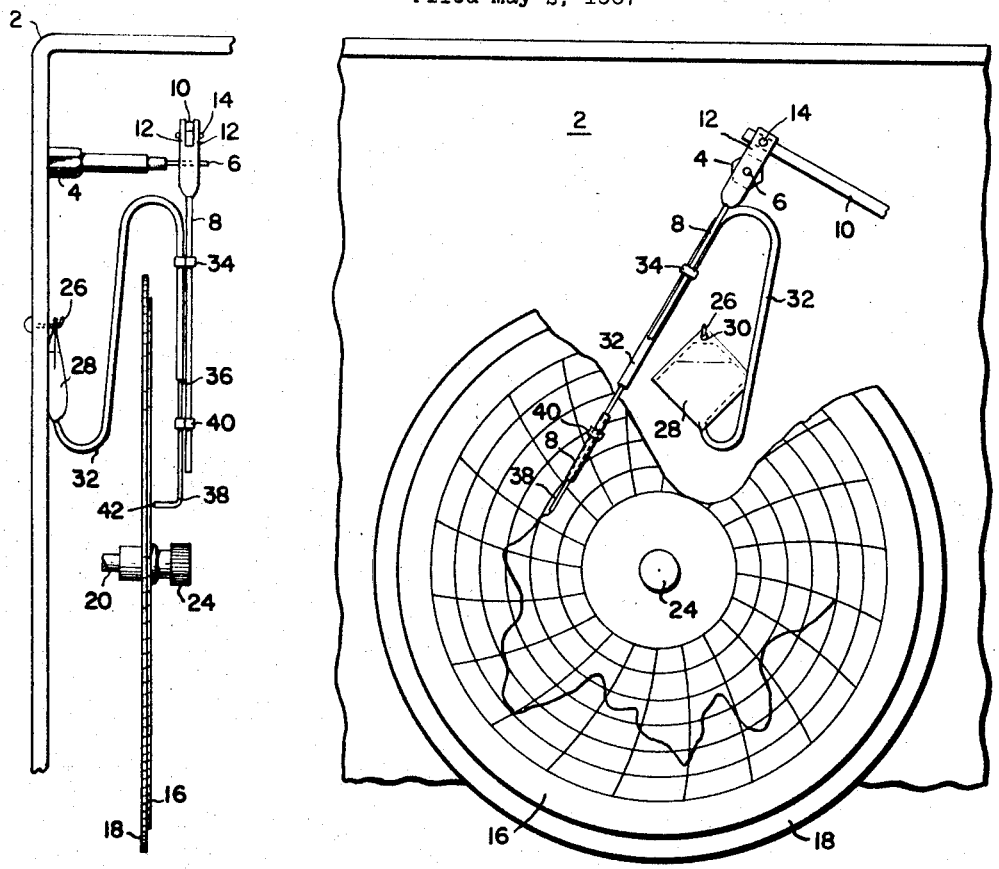
FIG. 1.
FIG. 2.
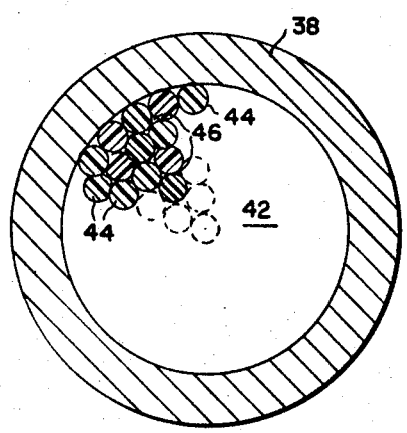
FIG. 4.
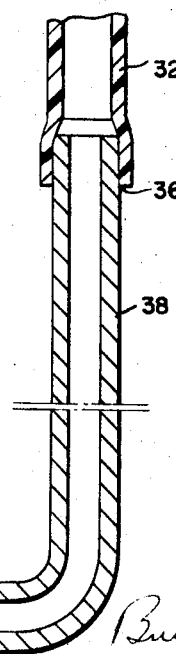
FIG. 3.
INVENTOR
GEORGE M. LANE
BY
ATTORNEYS – # United States Patent Office 3,452,359
Patented June 24, 1969

3,452,359
GRAVITATIONAL FEED INKING SYSTEM
George M. Lane, Odessa, Tex., assignor to American Meter Company, Philadelphia, Pa., a corporation of Delaware
Filed May 2, 1967, Ser. No. 635,609
Int. Cl. G01d 15/16
U.S. Cl. 346—140     4 Claims

ABSTRACT OF THE DISCLOSURE

An inking system for chart recorders and the like comprises a pen tip mounted on a movable arm and fed with ink through a flexible tube from a sealed flexible plastic bag mounted above the pen tip to provide a gravitational feed of ink. The pen tip comprises a bundle of Dacron fibers.

BACKGROUND OF THE INVENTION

This invention relates to inking systems for chart recorders and the like and particularly to inking systems in which a pen is carried by a movable member, the position of which is responsive to a variable to be recorded.

Heretofore, inking systems have been used in which the ink supply was part of a movably assembly, increasing its weight and giving rise to unbalance as the quantity of ink changed. In this class of devices, the movable member has generally had to be servo-operated. In others, the ink supply has been stationary, and the ink is fed to a recording pen mounted on the movable arm through a flexible capillary tube.

In inking systems in both of these classes, it has been necessary to situate the ink supply below the level of the pen tip to prevent a siphoning action which would cause the ink to drop from the pen tip, which would occur if the supply were at a higher level than the outlet. Although an ordinary recording pen could be fed by gravity from an ink supply situated above the pen tip, the head would be critical since too great a head would result in an undesired free flow of ink. Where the ink supply is stationary and the pen tip moves vertically as in a circular chart recorder, a non-uniformity may result in the marking of the chart. Furthermore, since the flow of ink through an ordinary pen tip is affected by the viscosity of the ink, the temperature of the ink is critical.

In order to start the flow of ink to the pen tip where the ink supply is contained in a flexible bag, it has been necessary to squeeze the bag. Where the ink supply is contained in a rigid bottle, pumping is necesary in order to initiate the flow of ink. Venting is also required, and consequently, the ink must be of a slow-drying type, and its disadvantages, particularly in strip-chart recorders, are obvious.

SUMMARY OF THE INVENTION

In accordance with the invention, the ink supply is contained in a sealed, flexible plastic bag having an outlet tube leading to a pen tip located at a point below the lowest level of the bag. The flow of ink depends on gravity rather than on capillary action and the distance between the level of ink in the supply bag and the pen is not critical. The ink may be fed either by a siphoning action through a flexible tube extending above the level of the bag or by direct downward flow.

The stylus consists of a tube from the end of which a tip or contact member projects which consists of a bundle of Dacron, nylon or similar fibers providing a porous structure, the fibers being preferably of Dacron. Bamboo can also be used as a tip material. The Dacron fibers provide a great number of very restricted passageways which resist the flow of ink under the pressure provided by the head so that no leakage occurs; but at the same time the ink is transferred freely to a paper chart engaged by the tip.

Various advantages are achieved by the invention. The flexibility of the bag makes venting entirely unnecessary, and the ink flows under its own weight. Changes in atmospheric pressure and temperature do not affect the operation of the ink system. Since the ink supply is completely sealed, there is no evaporation, and no dirt can enter the ink. Accordingly, the ink may be of a quick drying type, and ordinary fountain pen ink may be used.

The object of the invention, therefore, is to provide an inking system for chart recorders in which ink is fed from the ink supply to the stylus under the action of gravity and in which undesired flow of ink through the stylus under the action of gravity is avoided when the stylus and the chart are not in contact with each other or, if they are in contact with each other, when they are not moving with respect to each other. The movable stylus assembly is very light so that balancing problems are avoided, there being no appreciable shift of weight during operation.

Other objects will be apparent from the following description read in conjunction with the accompanying drawing.

BRIEF DESCRIPTION OF THE DRAWING

FIGURE 1 is a side elevation of a circular chart recorder having an inking system in accordance with the invention;

FIGURE 2 is a partially cut-away front elevation of the circular chart recorder of FIGURE 1;

FIGURE 3 is a vertical section of a capillary tube and stylus point in accordance with the invention; and FIGURE 4 is a section taken on the plane 4—4 of FIGURE 3 showing the details of the stylus tip.

DESCRIPTION OF THE PREFERRED EMBODIMENT

Referring to FIGURES 1 and 2, an instrument case 2 is provided on which is mounted a member 4, at the end 6 of which arm 8 is pivoted. Push rod 10, which responds to a variable to be recorded, may be connected at one end of an element which determines its position; for example, a bellows (not shown).

The opposite end of push rod 10 is pivoted between tines 12 of the fork-shaped upper end of arm 8 on pin 14. Arm 8 is adapted to swing, in response to movement of push rod 10, across the face of circular chart 16 from near its center to near its outer edge.

A chart mounting plate 18 is arranged to be driven through shaft 20 by a clock motor (not shown).

Circular chart 16 is removably mounted on plate 18 and secured by member 24 which is threaded onto a portion of shaft 20 which extends through plate 18.

A hook 26 is mounted on the vertical back wall of housing 2, and a flexible plastic bag 28 is suspended from hook 26 passing through a hole 30 on the bag.

Bag 28 is desirably formed by heat sealing two sides of a folded sheet of a thermoplastic material such as polyethylene, filling it with ink, inserting a length of polyvinyl tubing 32 into the open side and thereafter sealing the open side. The finished bag is entirely sealed, its only opening being to tubing 32. The opposite end of tube 32 is desirably plugged or sealed, so that the assembly, including bag 28 and tube 32 may be stored. When the assembly is ready for use, a small section may be cut off the end of the tube 32 in order to open it. Tube 32 is clamped onto arm 8 by clamp 34, and extends downwardly parallel to arm 8. Its open end 36 fits over tube 38 which is clamped to arm 8 by clamp 40. The bag is desirably made transparent.

Referring to FIGURE 3, the tube 38 may be formed from a substantialy rigid material, either metal or plastic. Its lower end is bent at a 90° angle, and a fiber bundle 42 is secured in the opening of tube 38 by pinching the extreme end of the tube so that the bundle is held firmly. The fiber bundle is desirably made from fibers of a synthetic plastic such as Dacron or nylon. The bundle consists of fibers arranged substantially parallel to one another and forming a plurality of substantially parallel capillary passages. Similar naturally occurring fiber bundles such as bamboo may be used.

Referring to FIGURE 4, the restricted passages between the Dacron fibers 44 in bundle 42 are indicated at 46. The diameters of fibers 44 are chosen so that the passages 46 between them, when the fibers are packed closely together, are of such a size as to permit the flow of ink between the fibers by capillary action, but to prohibit the free flow of ink under the pressure provided by the head.

In this arrangement, the head of the ink is not critical, and the ink bag may therefore be positioned at any point up to a large distance above the stylus tip.

Changes in atmospheric pressure and temperature do not affect the performance of the inking system, since the bag merely distends or contracts under pressure and temperature changes to produce a variable volume chamber without the production of any pressure difference in the ink.

Since the ink is entirely enclosed except at the stylus tip, there is no evaporation, and no dirt can enter the ink. The ink may therefore be of quick drying type, and ordinary fountain-pen ink may be used. With the invention, the viscosity of the ink is not critical, and temperature changes which may affect viscosity can be tolerated.

With the use of a Dacron fiber bundle as the stylus tip, only very slight pressures are required to cause ink to be transferred from the stylus tip to the chart. Consequently, the danger of damage, either to the chart or the stylus tip may be made negligible by providing only a very slight force to bias the stylus tip against the chart.

In order to prepare the chart recorder for use, an ink bag, containing ink of the desired color, is selected. These ink bags are desirably supplied with a length of flexible plastic tubing 32 sealed to the bag and in connection with its interior. The opposite end of tube 32 is sealed. The bag 28 is hung on support 26, and the end 36 of the flexible tube is held above the bag in order to drain ink into the bag. The end 36 of the tubing may then be opened by cutting off a short length. The open end is then slipped over the upper end of the tube 38. Bag 28 is then squeezed in order to force ink throughout the flexible tube and through tube 38 to the stylus tip. No further squeezing of the ink bag is required.

It will be apparent that the invention is adaptable to strip chart recorders and other types of recorders. In these, the ink supply may be either stationary or it may be carried by a moving, servo-operated carriage which also carries the stylus across the recording chart.

Other modifications can be made without departing from the invention.

I claim:

1. An inking system for chart recorders comprising a flexible, enclosed ink reservoir, a stylus, and means delivering ink from said reservoir to said stylus, wherein said stylus comprises a substantially rigid tip having multiple capillary passages providing continuous flow paths from one end of the tip to the other end of the tip and said means delivering ink is an internally open tube comprising in major part a flexible tube, said internally open tube having an internal diameter such that if it were unrestricted at its end, flow of ink through said tube would be continuous and wherein said tip is held in said internally open tube and located below the lowest level of the ink in said reservoir to provide gravitational flow of ink from said reservoir to said tip.

2. An inking system according to claim 1 wherein said substantially rigid tip comprises a plurality of substantially parallel Dacron fibers.

3. An inking system according to claim 1 in which said flexible, enclosed ink reservoir is a collapsible bag formed from at least one transparent, thermoplastic sheet.

4. An inking system according to claim 1 in which said ink reservoir is stationary.

References Cited

UNITED STATES PATENTS

| 1,096,747 | 5/1914 | Parodi | 178—96 |
| 1,790,996 | 2/1931 | McMichael | 346—140 |
| 2,082,591 | 6/1937 | Newman | 346—140 X |
| 2,820,689 | 1/1958 | Holloway | 346—140 |
| 3,361,516 | 1/1968 | Rigondaud | 401—292 |

FOREIGN PATENTS

| 1,243,524 | 9/1960 | France. |

RICHARD B. WILKINSON, *Primary Examiner.*

J. W. HARTARY, *Assistant Examiner.*